US005830930A

United States Patent [19]

Mahmud et al.

[11] Patent Number: 5,830,930
[45] Date of Patent: Nov. 3, 1998

[54] ELASTOMERIC COMPOUNDS INCORPORATING SILICON-TREATED CARBON BLACKS

[75] Inventors: Khaled Mahmud, Tyngsboro; Meng-Jiao Wang, Lexington, both of Mass.; Robert A. Francis, Park Orchards, Australia

[73] Assignee: Cabot Corporation, Boston, Mass.

[21] Appl. No.: 446,141

[22] Filed: May 22, 1995

[51] Int. Cl.⁶ .............. C08L 9/00; C08K 3/34; C08K 3/04
[52] U.S. Cl. .......... 523/215; 523/216; 524/261; 524/424; 524/571; 524/578; 524/495
[58] Field of Search .................. 523/216, 215; 524/261, 424, 578, 571, 495

[56] References Cited

U.S. PATENT DOCUMENTS

| | | | |
|---|---|---|---|
| 1,999,573 | 4/1935 | Odell | 524/495 |
| 2,375,795 | 5/1945 | Krejci | 423/456 |
| 2,564,700 | 8/1951 | Krejci | 423/456 |
| 2,632,713 | 3/1953 | Krejci | 106/475 |
| 2,891,595 | 6/1959 | Kuntz et al. | 526/339 |
| 3,094,428 | 6/1963 | Hamilton et al. | 106/475 |
| 3,203,819 | 8/1965 | Steenen et al. | 106/475 |
| 3,317,458 | 5/1967 | Clas et al. | 106/475 |
| 3,390,006 | 6/1968 | Takewell et al. | 106/475 |
| 3,622,650 | 11/1971 | Berstein et al. | 524/496 |
| 3,660,132 | 5/1972 | Illigen et al. | 106/475 |
| 3,663,285 | 5/1972 | Graf et al. | 106/475 |
| 3,689,452 | 9/1972 | Burke, Jr. | 523/351 |
| 3,716,513 | 2/1973 | Burke, Jr. | 523/200 |
| 3,873,489 | 3/1975 | Thurn et al. | 523/216 |
| 3,925,259 | 12/1975 | Watson et al. | 106/475 |
| 3,997,356 | 12/1976 | Thurn et al. | 523/216 |
| 4,006,031 | 2/1977 | Ferch et al. | 106/473 |
| 4,071,496 | 1/1978 | Kraus et al. | 423/445 |
| 4,074,035 | 2/1978 | Powers et al. | 526/185 |
| 4,108,679 | 8/1978 | Szczepanik et al. | 106/475 |
| 4,211,578 | 7/1980 | Scott, IV | 106/475 |
| 4,229,333 | 10/1980 | Wolff et al. | 524/571 |
| 4,297,145 | 10/1981 | Wolff et al. | 523/213 |
| 4,360,627 | 11/1982 | Okado et al. | 524/496 |
| 4,468,496 | 8/1984 | Takeuchi et al. | 525/233 |
| 4,517,335 | 5/1985 | Wolff et al. | 524/552 |
| 4,590,052 | 5/1986 | Chevallier et al. | 423/339 |
| 4,670,059 | 6/1987 | Hackleman et al. | 428/405 |
| 4,820,751 | 4/1989 | Takeshita et al. | 523/216 |
| 4,822,844 | 4/1989 | Kawakami et al. | 524/496 |
| 4,824,900 | 4/1989 | Sakurai | 524/495 |
| 4,866,131 | 9/1989 | Fujimaki et al. | 525/96 |
| 4,894,420 | 1/1990 | Scriver | 525/237 |
| 5,008,223 | 4/1991 | Speer et al. | 106/450 |
| 5,149,732 | 9/1992 | Igarashi et al. | 524/42 |
| 5,159,009 | 10/1992 | Wolff et al. | 524/572 |
| 5,162,409 | 11/1992 | Mroczkowski | 524/495 |
| 5,227,425 | 7/1993 | Rauline | 524/493 |
| 5,286,291 | 2/1994 | Bernhardt et al. | 106/490 |
| 5,294,253 | 3/1994 | Carlson et al. | 524/495 |
| 5,328,949 | 7/1994 | Sandstrom | 524/262 |
| 5,336,730 | 8/1994 | Sandstrom | 524/262 |
| 5,401,789 | 3/1995 | Wolf et al. | 524/496 |
| 5,430,087 | 7/1995 | Carlson et al. | 524/495 |

FOREIGN PATENT DOCUMENTS

| | | |
|---|---|---|
| 0 411 160 A1 | 2/1991 | European Pat. Off. . |
| 0 501 227 A1 | 9/1992 | European Pat. Off. . |
| 0 641 823 A1 | 3/1995 | European Pat. Off. . |
| 0 646 621 A1 | 4/1995 | European Pat. Off. . |
| 0 711 805 A1 | 5/1996 | European Pat. Off. . |
| 1230893 | 9/1960 | France . |
| 35 02 494 A1 | 8/1985 | Germany . |
| 5-178604 | 7/1993 | Japan . |
| 7-30269 | 4/1995 | Japan . |
| 1139620 | 1/1969 | United Kingdom . |
| 1213186 | 11/1970 | United Kingdom . |
| 1363428 | 7/1974 | United Kingdom . |
| 2 044 741 | 10/1980 | United Kingdom . |

OTHER PUBLICATIONS

Concise Encyclopedia of Polymer Science and Engineering, Wiley, 1990, pp. 104–105.
Carbon (Carbon Black) reprinted from Kirk–Othmer: Encyclopedia of Chemical Technology, vol. 4, Third Edition, pp. 631–643, 1978.
Derwent Abstract, Japanese Patent Application No. 80–73657, Mar. 19, 1996.
Derwent Abstract, WPI Acc No. 78–73373A/41, Japanese Patent Application No. 53–100190, 1978.
Derwent Abstract, WPI Acc No. 95–019436/03, Japanese Patent Application No. 63–06289, 1994.
Derwent Abstract, WPI Acc No. 92–369382/45, Japanese Patent Application No. 4–270199, 1992.
Derwent Abstract, WPI Acc No. 90–335599/45, DD No. 279537, 1990.
Derwent Abstract, WPI Acc No. 90–128540/17, Japanese Patent Application No. 2–077483, 1990.
Derwent Abstract, WPI Acc No. 88–261546/37, Japanese Patent Application No. 63–190800, 1988.
Derwent Abstract, WPI Acc No. 88–052867/08, Japanese Patent Application No. 63–008442, 1988.
Derwent Abstract, WPI Acc No. 87–034097/05, Japanese Patent Application No. 61–291659, 1986.
Derwent Abstract, WPI Acc No. 86–037092/06, U.S. Patent No. 4,605,542, 1986.
Dialog Abstract No. 1933022, U.S Patent 4,820,751, 1989.
Chemical Abstract vol. 114, No. 14, No. 124715d (1990).

(List continued on next page.)

*Primary Examiner*—Andrew E. C. Merriam
*Attorney, Agent, or Firm*—James A. Cairns; Martha A. Finnegan; Michelle B. Lando

[57] ABSTRACT

Disclosed are elastomeric compounds including an elastomer and a silicon-treated carbon black, and optionally including a coupling agent. The elastomeric compound exhibits poorer abrasion resistance, lower hysterisis at high temperature and comparable or increased hysterisis at low temperature compared to an elastomer containing an untreated carbon black. Elastomeric compounds incorporating an elastomer and an oxidized, silicon-treated carbon black are also disclosed. Also disclosed are methods for preparing elastomers compounded with the treated carbon black.

19 Claims, 7 Drawing Sheets

OTHER PUBLICATIONS

Chemical Abstract vol. 112, No. 18, No. 160248w, 1988.
Chemical Abstract vol. 110, No. 6, No. 48370n, 1986.
Chemical Abstract vol. 69, No. 18, No. 68396p, 1967.
Chemical Abstract vol. 94, No. 16, No. 122906m, 1980.
Chemical Abstract vol. 66, No. 24, No. 105491b, 1966.
Chemical Abstract vol. 67, No. 2, No. 3806m, 1966.
Chemical Abstract vol. 102, No. 4, No. 28447z, 1984.
Chemical Abstract vol. 100, No. 22, No. 176125s, 1983.
Chemical Abstract vol. 106, No. 28, No. 224473b, 1987.
Chemical Abstract vol. 94, No. 8, No. 48630y, 1980.
Chemical Abstract vol. 88, No. 22, No. 161466p, 1978.
Chemical Abstract vol. 104, No. 12, No. 90590k, 1985.
Chemical Abstract vol. 105, No. 8, No. 61488y, 1985.

Ouyang et al., "Carbon Black Effects on Treadwear," Presented at a Meeting of the Rubber Division, American Chemical Society, Las Vegas, Nevada, May 29–Jun. 1, 1990.
Agostini, et al., "New Compound Technology," Goodyear Technical Center Luxembourg (1994).
Dialog Abstract of Japanese Application No. 4–362009, 1992.
Dialog Abstract of Japanese Application No. 4–276000, 1992.
Studebaker et al., "The Rubber Compound and its Composition," *Science and Technology of Rubber,* Academic Press, 1978, Chapter 9, pp. 367–375.
"Tires," Reprinted from *Encyclopedia of Polymer Science and Engineering,* vol. 16, Second Edition, 1969, pp. 834–861.

ELASTOMERIC COMPOUNDS INCORPORATING SILICON-TREATED CARBON BLACKS

RELATED APPLICATIONS

This application is related to the following applications identified by title and attorneys' docket number, filed on even date herewith, for which serial numbers have not yet been accorded: Mineral Binders Colored With Silicon-Containing Carbon Black (0639/0A991); Elastomeric Compounds Incorporating Partially Coated Carbon Blacks (0639/0B060); and Elastomeric Compounds Incorporating Silicon-Treated Carbon Blacks and Coupling Agents (0639/0B059). The disclosure of each of the foregoing applications is hereby incorporated by reference.

FIELD OF THE INVENTION

The present invention relates to novel elastomeric compounds exhibiting improved hysterisis properties. More particularly, the invention relates to novel elastomeric compounds incorporating silicon-treated carbon blacks.

BACKGROUND OF THE INVENTION

Carbon blacks are widely used as pigments, fillers and reinforcing agents in the compounding and preparation of rubber and other elastomeric compounds. Carbon blacks are particularly useful as reinforcing agents in the preparation of elastomeric compounds used in the manufacture of tires.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate. Carbon blacks are generally characterized on the basis of analytical properties, including, but not limited to particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037-Method A) and cetyl-trimethyl ammonium bromide adsorption value (CTAB) (measured by ASIM test procedure D3765 [09.01]), are measures of specific surface area. Dibutylphthalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black-containing compounds when constructing the tread and other portions of the tire. For example, a suitable tread compound will employ an elastomer compounded to provide high abrasion resistance and good hysterisis balance at different temperatures. A tire having high abrasion resistance is desirable because abrasion resistance is proportional to tire life. The physical properties of the carbon black directly influence the abrasion resistance and hysterisis of the tread compound. Generally, a carbon black with a high surface area and small particle size will impart a high abrasion resistance and high hysterisis to the tread compound. Carbon black loading also affects the abrasion resistance of the elastomeric compounds. Abrasion resistance increases with increased loading, at least to an optimum point, beyond which abrasion resistance actually decreases.

The hysterisis of an elastomeric compound relates to the energy dissipated under cyclic deformation. In other words, the hysterisis of an elastomeric composition relates to the difference between the energy applied to deform the elastomeric composition and the energy released as the elastomeric composition recovers to its initial undeformed state. Hysterisis is characterized by a loss tangent, tan $\delta$, which is a ratio of the loss modulus to the storage modulus (that is, viscous modulus to elastic modulus). Tires made with a tire tread compound having a lower hysterisis measured at higher temperatures, such as 40° C. or higher, will have reduced rolling resistance, which in turn, results in reduced fuel consumption by the vehicle using the tire. At the same time, a tire tread with a higher hysterisis value measured at low temperature, such as 0° C. or lower, will result in a tire with high wet traction and skid resistance which will increase driving safety. Thus, a tire tread compound demonstrating low hysterisis at high temperatures and high hysterisis at low temperatures can be said to have a good hysterisis balance.

There are many other applications where it is useful to provide an elastomer exhibiting a good hysterisis balance but where the abrasion resistance is not an important factor. Such applications include but are not limited to tire components such as undertread, wedge compounds, sidewall, carcass, apex, bead filler and wire skim; engine mounts; and base compounds used in industrial drive and automotive belts.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction accounts for the poor performance of silica. The silica-elastomer interaction can be improved by chemically bonding the two with a chemical coupling agent, such as bis (3-triethoxysilylpropyl) tetrasulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysterisis balance. However, elastomer compounds containing silica as the primary reinforcing agent exhibit low thermal conductivity, high electrical resistivity, high density and poor processibility.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

It is an object of the present invention to provide novel elastomeric compounds exhibiting improved hysterisis balance. It is another object to provide an elastomeric compound incorporating silicon-treated carbon blacks. It is yet another object of the present invention to provide an elastomeric compound incorporating silicon-treated carbon blacks, wherein the carbon black may be efficiently coupled to the elastomer with a coupling agent. Such a carbon black may be employed for example, in tire compounds, industrial rubber products and other rubber goods. It is yet another object to provide a reinforcing agent which includes such a carbon black and a coupling agent. Other objects of the present invention will become apparent from the following description and claims.

SUMMARY OF THE INVENTION

The present invention is directed to an elastomeric compound including an elastomer and a silicon-treated carbon black, and optionally including a coupling agent. The silicon-treated carbon black imparts to the elastomer poorer abrasion resistance, lower hysterisis at high temperature and comparable or increased hysterisis at low temperature compared to an untreated carbon black. Elastomeric compounds incorporating an elastomer and an oxidized, silicon-treated carbon black are also disclosed. Also disclosed are methods for preparing elastomeric compounds with the silicon-treated carbon blacks.

DETAILED DESCRIPTION OF THE INVENTION

The present inventors have discovered that elastomeric compounds having desirable hysterisis and other properties may be obtained by compounding an elastomer with a silicon-treated carbon black. In the silicon-treated carbon black a silicon-containing species, including but not limited to, oxides and carbides of silicon, may be distributed through at least a portion of the carbon black aggregate as an intrinsic part of the carbon black.

In an elastomeric compound including an elastomer and a silicon-treated carbon black, the silicon-treated carbon black imparts to the elastomer poorer abrasion resistance, comparable or higher loss tangent at low temperature and a lower loss tangent at high temperature, compared to an untreated carbon black.

Silicon-treated carbon black aggregates do not represent a mixture of discrete carbon black aggregates and discrete silica aggregates. Rather, the silicon-treated carbon black aggregates of the present invention include at least one silicon-containing region either at the surface of or within the carbon black aggregate.

When the silicon-treated carbon black is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

Figure 1:
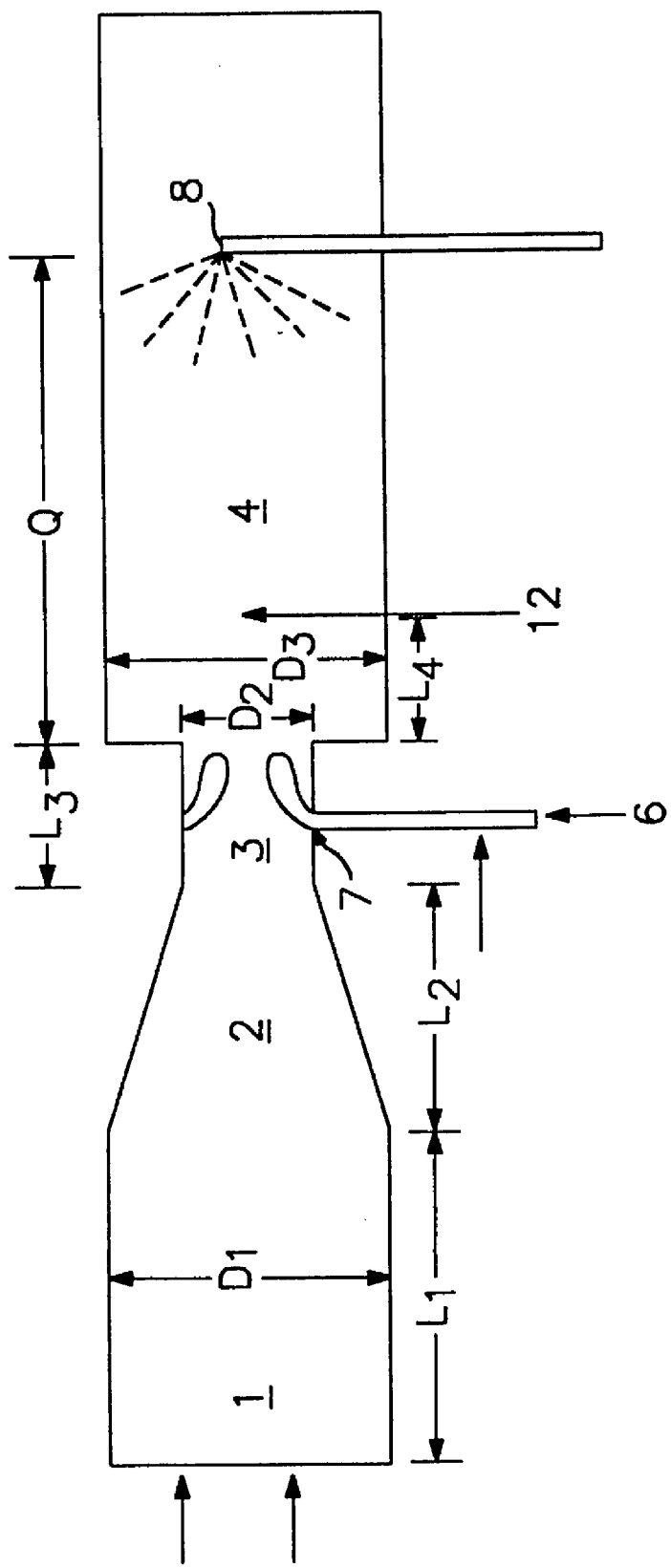
FIG. 1 is a schematic view of a portion of one type of carbon black reactor which may be used to produce the treated carbon blacks of the present invention.

The silicon-treated carbon blacks may be obtained by manufacturing the carbon black in the presence of volatizable silicon-containing compounds. Such carbon blacks are preferably produced in a modular or "staged," furnace carbon black reactor as depicted in FIG. 1. The furnace carbon black reactor has a combustion zone 1, with a zone of converging diameter 2; a feedstock injection zone with restricted diameter 3; and a reaction zone 4.

To produce carbon blacks with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustion gases, the oxidant stream may be pre-heated.

The hot combustion gas stream flows downstream from zones 1 and 2 into zones 3 and 4. The direction of the flow of hot combustion gases is shown in FIG. 1 by the arrow. Carbon black feedstock, 6, is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas-stream. In the latter instance, atomization occurs by the force of the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations.

The mixture of carbon black-yielding feedstock and hot combustion gases 'flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is optionally subjected to a pelletization step.

The silicon treated carbon blacks of the present invention may be made by introducing a volatilizable silicon containing compound into the carbon black reactor at a point upstream of the quench zone. Useful volatilizable compounds include any compound which is volatilizable at carbon black reactor temperatures. Examples include, but are not limited to silicates such as tetaethoxy orthosilicate (TEOS) and tetramethoxy orthosilicate, silanes such as, tetrachloro silane, and trichloro methylsilane; and volatile silicone polymers such as octamethylcyclotetrasiloxane (OMTS). The flow rate of the volatilizable compound will determine the weight percent of silicon in the treated carbon black. The weight percent of silicon in the treated carbon black should range from about 0.1% to 25%, and preferably about 0.5% to about 10%, and most preferably about 2% to about 6%.

The volatilizable compound may be premixed with the carbon black-forming feedstock and introduced with the feedstock into the reaction zone. Alternatively, the volatilizable compound may be introduced to the reaction zone separately from the feedstock injection point. Such introduction may be upstream or downstream from the feedstock injection point, provided the volatilizable compound is introduced upstream from the quench zone. For example, referring to FIG. 1, the volatilizable compound may be introduced to zone Q at point 12 or any other point in the zone. Upon volatilization and exposure to high temperatures in the reactor, the compound decomposes, and reacts with other species in the reaction zone, yielding silicon treated carbon black, such that the silicon, or silicon containing species, becomes an intrinsic part of the carbon black.

As discussed in further detail below, if the volatilizable compound is introduced substantially simultaneously with the feedstock, the silicon-treated regions are distributed throughout at least a portion of the carbon black aggregate.

In a second embodiment of the present invention, the volatilizable compound is introduced to the reaction zone at a point after carbon black formation has commenced but before the reaction stream has been subjected to the quench. In this embodiment, silicon-treated carbon black aggregates are obtained in which a silicon containing species is present primarily at or near the surface of the carbon black aggregate.

It has been found by the present inventors that the elastomeric compounds incorporating a treated carbon black may be additionally compounded with one or more coupling agents to further enhance the properties of the elastomeric compound. Coupling agents useful for coupling silica or carbon black to an elastomer, are expected to be useful with the silicon-treated carbon blacks. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto) propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

The silicon-treated carbon black incorporated in the elastomeric compound of the present invention may be oxidized and/or combined with a coupling agent. Suitable oxidizing agents include, but are not limited to, nitric acid and ozone. Coupling agents which may be used with the oxidized carbon blacks include, but are not limited to, any of the coupling agents set forth above.

The silicon-treated carbon blacks of the present invention may have an organic group attached, as disclosed in U.S. patent application Ser. No. 356,459, filed Dec. 15, 1994, and entitled "EPDM, HNBR and Butyl Rubber Compositions Containing Carbon Black Products", hereby incorporated by reference herein. Preferred organic groups include aromatic sulfides, represented by the formulas Ar—$S_n$—Ar' or Ar—$S_n$—Ar", wherein Ar and Ar' are independently arylene groups, Ar" is an aryl and n is 1 to 8.

Another set of organic groups which may be attached to the carbon black are organic groups substituted with an ionic or an ionizable group as a functional group, as disclosed in U.S. patent application Ser. No. 356,660, filed Dec. 15, 1994 and entitled "Reaction of Carbon Black with Diazonium Salts, Resultant Carbon Black Products and Their Uses", hereby incorporated by reference herein.

The elastomeric compounds of the present invention may be prepared from the treated carbon blacks by compounding with any elastomer including those useful for compounding a carbon black. Any suitable elastomer may be compounded with the treated carbon blacks to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene. Preferably, the elastomer has a glass transition temperature (Tg) as measured by differential scanning colorimetry (DSC) ranging from about −120° C. to about 0° C. Examples include, but are not limited, styrene-butadiene rubber (SBR), natural rubber, polybutadiene, and polyisoprene. Blends of any of the foregoing may also be used.

The elastomeric compositions may include one or more curing agents such as, for example, sulfur, sulfur donors, activators, accelerators, peroxides, and other systems used to effect vulcanization of the elastomer composition.

The resultant elastomeric compounds containing treated carbon black and optionally containing one or more coupling agents may be used for various elastomeric products such as treads for vehicle tires, industrial rubber products, seals, timing belts, power transmission belting, and other rubber goods. When utilized in tires, the elastomeric compounds may be used in the tread or in other components of the tire, for example, the carcass and sidewall.

Tread compounds produced with the present elastomeric compounds incorporating a silicon-treated carbon black but without a coupling agent, provide improved dynamic hysterisis characteristics. However, elastomeric compounds incorporating a silicon-treated carbon black and a coupling agent demonstrate further improved characteristics when tested for dynamic hysteresis at different temperatures and resistance to abrasion. Therefore, a tire incorporating a tread compound manufactured with an elastomeric compound of the present invention, incorporating both a silicon-treated carbon black and a coupling agent will demonstrate even lower rolling resistance, good wet traction and better wear resistance when compared with a tire made with a tread compound incorporating the treated carbon black but lacking the coupling agent.

The following examples illustrate the invention without limitation.

EXAMPLES

Example 1

Silicon-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table 1 below, were employed.

These conditions result in the formation of a carbon black identified by the ASIM designation N234. A commercially available example of N234 is Vulcan® 7H from Cabot Corporation, Boston, Mass. These conditions were altered by adding a volatilizable silicon-containing compound into the reactor, to obtain a silicon-treated carbon black. The flow rate of the volatilizable compound was adjusted to alter the weight percent of silicon in the treated carbon black. The weight percent of silicon in the treated carbon black was determined by the ashing test, conducted according to ASIM procedure D-1506.

One such new treated carbon black was made by injecting an organo-silicon compound, namely octamethyl-cyclotetrasiloxane (OMTS), into the hydrocarbon feedstock. This compound is sold as "D4" by Dow Corning Corporation, Midland, Mich. The resultant silicon-treated carbon black is identified herein as OMTS-CB. A different silicon-treated carbon black (TEOS-CB) was prepared by introducing a second silicon-containing volatilizable compound, tetraethoxy silane, (sold as TEOS, by Huls America, Piscataway, N.J.), into the hydrocarbon feedstock.

Since changes in reactor temperature are known to alter the surface area of the carbon black, and reactor temperature is very sensitive to the total flow rate of the feedstock in the injection zone (zone 3 in FIG. 1), the feedstock flow rate was adjusted downward to approximately compensate for the introduction of the volatilizable silicon-containing compound, such that a constant reactor temperature was maintained. This results in an approximately constant external surface area (as measured by t area) for the resultant carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the silicon-treated, carbon blacks described throughout the following examples.

The external surface area (t-area) was measured following the sample preparation and measurement procedure described in ASTM D3037—Method A for Nitrogen surface area. For this measurement, the nitrogen adsorption isotherm was extended up to 0.55 relative pressure. The relative pressure is the pressure (P) divided by the saturation pressure ($P_0$) (the pressure at which the nitrogen condenses). The adsorption layer thickness ($t_1$) was then calculated using the relation:

$$t_1 = \frac{13.99}{\sqrt{0.034 - \log(P/P_0)}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

t-area, $m^2/gm$ = 15.47 × slope

TABLE 1

| | Carbon Black | | |
|---|---|---|---|
| Conditions | N234 | TEOS-CB | OMTS-CB |
| Air Rate, kscfh | 12.8 | 12.8 | 12.8 |
| Gas Rate, kscfh | 0.94 | 0.94 | 0.94 |
| feedstock rate, lbs/hr | 166 | 139 | 155 |
| Si compound rate, lbs/hr | 0 | 16 | 5 |

The resultant carbon blacks were analyzed for surface area and silicon content. These values are set forth in Table 2 below:

TABLE 2

| | Carbon Black | | |
|---|---|---|---|
| Properties | N234 | TEOS-CB | OMTS-CB |
| % Silicon in Carbon Black | 0.02 | 2.85 | 2.08 |
| DBP, cc/100 g | 125.0 | 114.0 | 115.0 |
| CDBP, cc/100 g | 101.5 | 104.1 | 103.5 |
| t-Area, $m^2/g$ | 117.0 | 121.0 | 121.0 |
| $N_2$ area, $m^2/g$ | 120.4 | 136.0 | 133.0 |

Example 2

A scanning transmission electron microscope (STEM) coupled to an energy dispersive X-ray analyzer, was used to further characterize the silicon-treated carbon black. The following Table 3 compares N234, OMTS-CB (prepared according to Example 1) and N234 to which 3.7% by weight silica (L90, sold as CAB-O-SIL® L90, by Cabot Corporation, Boston, Mass.) was added to form a mixture. As described below, the STEM system may be used to examine an individual aggregate of carbon black for elemental composition. A physical mixture of carbon black and silica will result in the identification of silica aggregates which show mostly silicon signal and little or background carbon signal. Thus, when multiple aggregates are examined in a mixture, some of the aggregates will show a high Si/C signal ratio, corresponding to aggregates of silica.

Five mg of carbon black was dispersed into 20 ml of chloroform and subjected to ultrasonic energy using a probe sonicator (W-385 Heat Systems Ultra Sonicator). A 2 ml aliquot was then dispersed into 15 ml of chloroform using a probe sonicator for three minutes. The resulting dispersion was placed on a 200 mesh nickel grid with aluminum substrate. The grid was then placed under a Fisons HB501 Scanning Transmission Electron Microscope (Fisons, West Sussex, England) equipped with an Oxford Link AN10000 Energy Dispersive X-ray Analyzer (Oxford Link, Concord, Mass.). Initially the grid was scanned for potential silica aggregates at low magnification (less than 200,000×). This was done by searching for aggregates that had a Si/C count ratio greater than unity. After this initial scan, typically thirty aggregates were selected for detailed analysis at higher magnification (from between 200,000× and 2,000,000×). The selected aggregates included all of the aggregates which contained Si/C count ratios greater than unity, as identified by the initial scan. The highest ratios of Si/C counts thus determined are set forth in Table 3 for N234, OMTS-CB and a mixture of N234 and silica.

TABLE 3

Ratio of Si/C Signal Measured with STEM

| | % Si in Modified Sample | Highest Ratio of Si/C Counts per Aggregate |
|---|---|---|
| N234 | 0 | 0.02 |
| OMTS-CB | 3.28 | 0.27 |
| N234 + 3.7% silica (L90) | 1.7 | 49 |

Thus, a well dispersed mixture of carbon black and silica having the same silicon content as the OMTS-CB shows 180 times higher peak Si/C counts. This data shows that the OMTS-CB carbon black is not a simple physical mixture of silica and carbon black, but rather that the silicon is a part of the intrinsic chemical nature of the carbon black.

Example 3

HF Treatment

Hydrofluoric acid (BF) is able to dissolve silicon compounds but does not react with carbon. Thus, if either a conventional (untreated) carbon black or a mixture of silica and carbon black is treated with HF, the surface and surface area of the carbon black will remain unchanged, because it is unaffected by the dissolution of the silicon compounds removed from the mixture. However, if silicon containing species are distributed throughout at least a portion, including the surface, of the carbon black aggregate, the surface area will markedly increase as micropores are formed as the silicon compound is dissolved out of the carbon black structure.

Five grams of the carbon black to be tested were extracted with 100 ml of 10% v/v hydrofluoric acid for 1 hour. The silicon content and nitrogen surface area were measured before and after the HF treatment. The results are shown in Table 4.

TABLE 4

HF Treatment

| | % Si Before HF treatment | % Si After HF Treatment | $N_2$SA Before HF treatment | $N_2$SA After HF treatment |
|---|---|---|---|---|
| N234 | 0.02 | 0.05 | 123 | 123 |
| OMTS-CB | 3.3 | 0.3 | 138 | 180 |

Photomicrographs were taken of the carbon black samples before and after HF treatment. The photomicrographs are shown in FIGS. 4a–4d. These photographs show that the silicon-treated carbon blacks have a rougher surface, consistent with increased microporosity after the HF treatment, compared to the untreated carbon black.

Example 3A

Another silicon-treated carbon black was made by injecting TEOS into the reaction zone of the reactor immediately (one foot) downstream from the hydrocarbon feedstock injection plane, as indicated at injection point 12 in FIG. 1. All other reaction conditions were maintained as required for manufacturing N234 black, as described in Example 1. The TEOS flow rate was adjusted to 17.6 lbs per hour.

The resultant black was analyzed for silicon content and surface area, before and after HF extraction as described in Example 3. The results are described in Table 4A.

TABLE 4A

TEOS-CB'—manufactured by injection of TEOS into reaction zone

| | % Si | $N_2$Area |
|---|---|---|
| Before HF | 2.27 | 127.7 |
| After HF | 0.04 | 125.8 |

Thus, no increase in $N_2$ surface area was seen after HF extraction of the TEOS-CB'. Analysis of the aggregates by the STEM procedure described in Example 2 also showed silicon to be present in the aggregates and not as independent silica entities. These results show that in this case the silicon-containing species of the silicon-treated carbon blacks are primarily located near the surface.

Example 4

Preparation of Elastomeric Compositions

The carbon blacks of the previous Examples were used to make elastomeric compounds. Elastomeric compositions incorporating the silicon-treated carbon blacks discussed above, were prepared using the following elastomers: solution SBR (Duradene 715 and Cariflex S-1215, from Firestone Synthetic Rubber & Latex Co., Akron, Ohio), functionalized solution SBR (NS 114 and NS 116 from Nippon Zeon Co., SL 574 and TO589 from Japan Synthetic Rubber Co.), emulsion SBR (SBR 1500, from Copolymer Rubber & Chemicals, Corp., Baton Rouge, La.), and natural rubber (SMR5, from Malaysia).

The elastomeric compositions were prepared according to the following formulation:

TABLE 5

| Ingredient | Parts by weight |
|---|---|
| elastomer | 100 |
| carbon black | 50 |
| zinc oxide | 3 |
| stearic acid | 2 |
| Flexzone 7P ® | 1 |
| Durax ® | 1.25 |
| Captax ® | 0.2 |
| sulfur | 1.75 |
| Si-69 (optional) | 3 or 4 |

Flexzone 7P®, N-(1,3-dimethyl butyl)-N'-phenyl-p-phenylene diamine, is an anti-oxidant available from Uniroyal Chemical Colo., Middlebury, Conn. Durax®, N-cyclohexane-2-benzothiazole sulphenamide, is an accelerator available from R. T. Vanderbilt Co., of Norwalk, Conn., and Captax®, 2-mercaptobenzothiazole, is an accelerator available from R. T. Vanderbilt Co.

The elastomeric compounds were prepared using a two-stage mixing procedure. The internal mixer used for preparing the compounds was a Plasti-Corder EPL-V (obtained from C. W. Brabender, South Hackensack, N.J.) equipped with a cam-type mixing head (capacity 600 ml). In the first stage, the mixer was set at 80° C., and the rotor speed was set at 60 rpm. After the mixer was conditioned to 100° C. by heating the chamber with a dummy mixture, the elastomer was loaded and masticated for 1 minute. Carbon black, pre-blended with zinc oxide (obtained from New Jersey Zinc Co., N.J.), and optionally a coupling agent, was then added. After three minutes, stearic acid (obtained from Emery Chemicals, Cincinnati, Ohio) and anti-oxidant were added. Mixing was continued for an additional two minutes. The stage 1 masterbatch was then dumped from the mixer at five minutes total. This was then passed through an open mill (four inch, two-roll mil, obtained from C. W. Brabender, South Hackensack, N.J.) three times and stored at room temperature for two hours.

In the second stage, the mixing chamber temperature was set to 80° C. and the rotor speed was set to 35 rpm. After the mixer was conditioned the masterbatch from stage one was loaded and mixed for one minute. The curative package (including sulfur, Durax and Captax) was then added. The material was dumped from the mixer at two minutes and passed through the open mill three times.

Batches of the compounds were prepared as described for the carbon blacks in the previous Examples. The same grade of conventional carbon black was used as a control. For each carbon black, two batches were prepared. The first batch was made using Si-69 as the coupling agent. The second batch was made without a coupling agent. After mixing, each of the elastomeric compositions was cured at 145° C. to an optimum cure state according to measurements made with a Monsanto ODR Rheometer.

Example 5

Bound Rubber Test

The bound rubber content of an elastomeric compound incorporating carbon black can be taken as a measure of the surface activity of the carbon black. The higher the bound rubber content, the higher the surface activity of the carbon black. Bound rubber was determined by extraction of an elastomeric compound with toluene at room temperature. The bound rubber is the elastomer remaining after extraction by the solvent. The elastomer used was solution SBR (SSBR) Duradene 715 without a coupling agent, as described above in Example 4.

Figure 2:
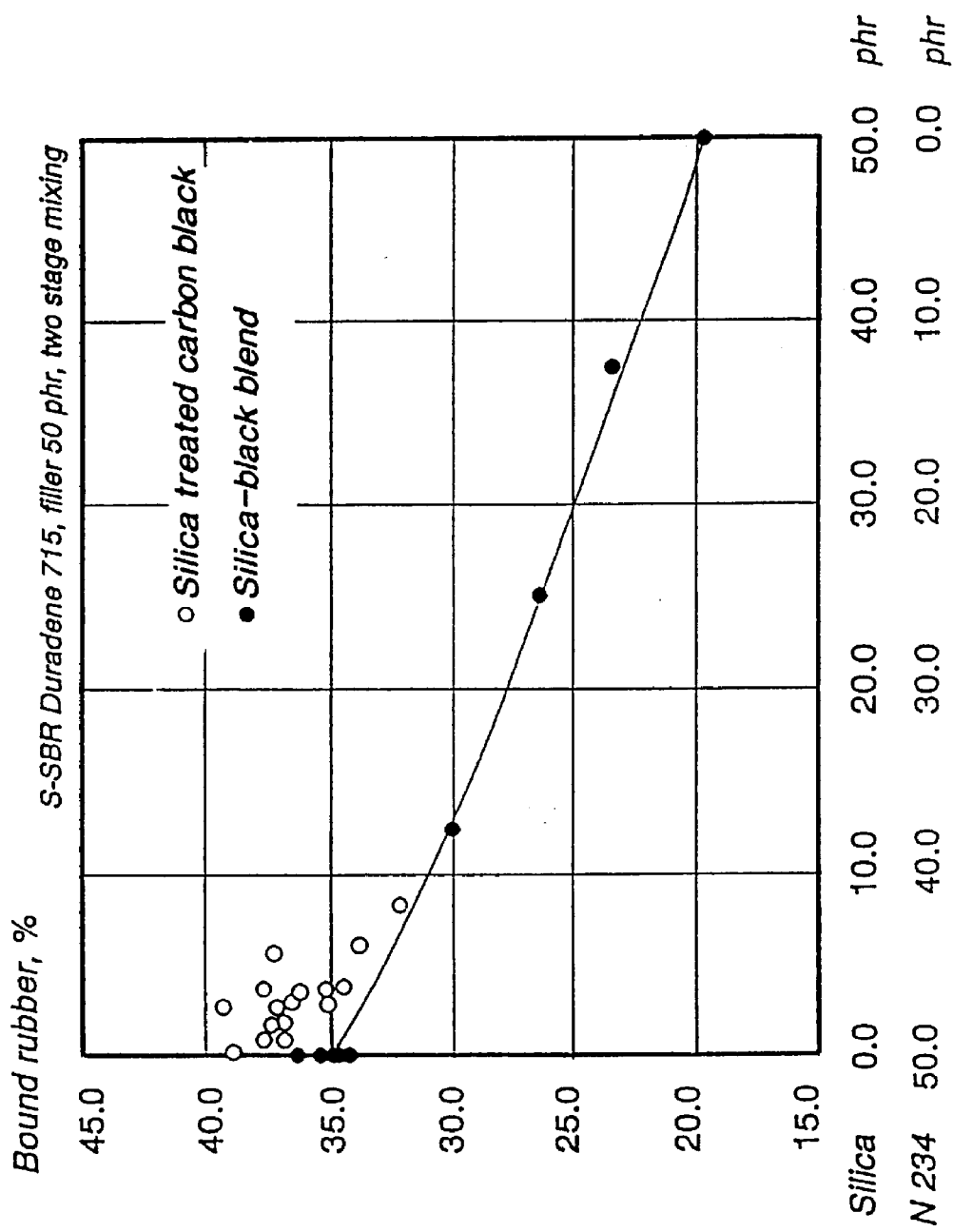
FIG. 2 is a graph demonstrating the results of a bound rubber test carried out on elastomeric compositions of the present invention.

As seen in FIG. 2, the bound rubber was determined for a series of blends of silica and carbon black, which serve as a reference against which to compare the bound rubber of the silicon-treated carbon black. The results of the bound rubber measurements for the two sets of compounds are plotted against their equivalent silica content in FIG. 2. For the treated carbon blacks, the equivalent silica content is a theoretical value calculated from the total silicon as measured by ashing. It is seen that silicon-treated carbon blacks yield a higher bound rubber than their conventional counterparts. This suggests that the treated carbon black surface is relatively more active. Moreover, as shown in FIG. 2, the bound rubber content of treated carbon black-filled compounds lie well above the reference line generated from the blends of carbon black and silica. This confirms that the treated carbon black is not a physical mixture of silica and carbon black.

Example 6

Dynamic Hysterisis and Abrasion Resistance

The dynamic hysterisis and abrasion resistance rates were measured for the elastomeric compositions produced according to Example 4 above.

Figure 3A:
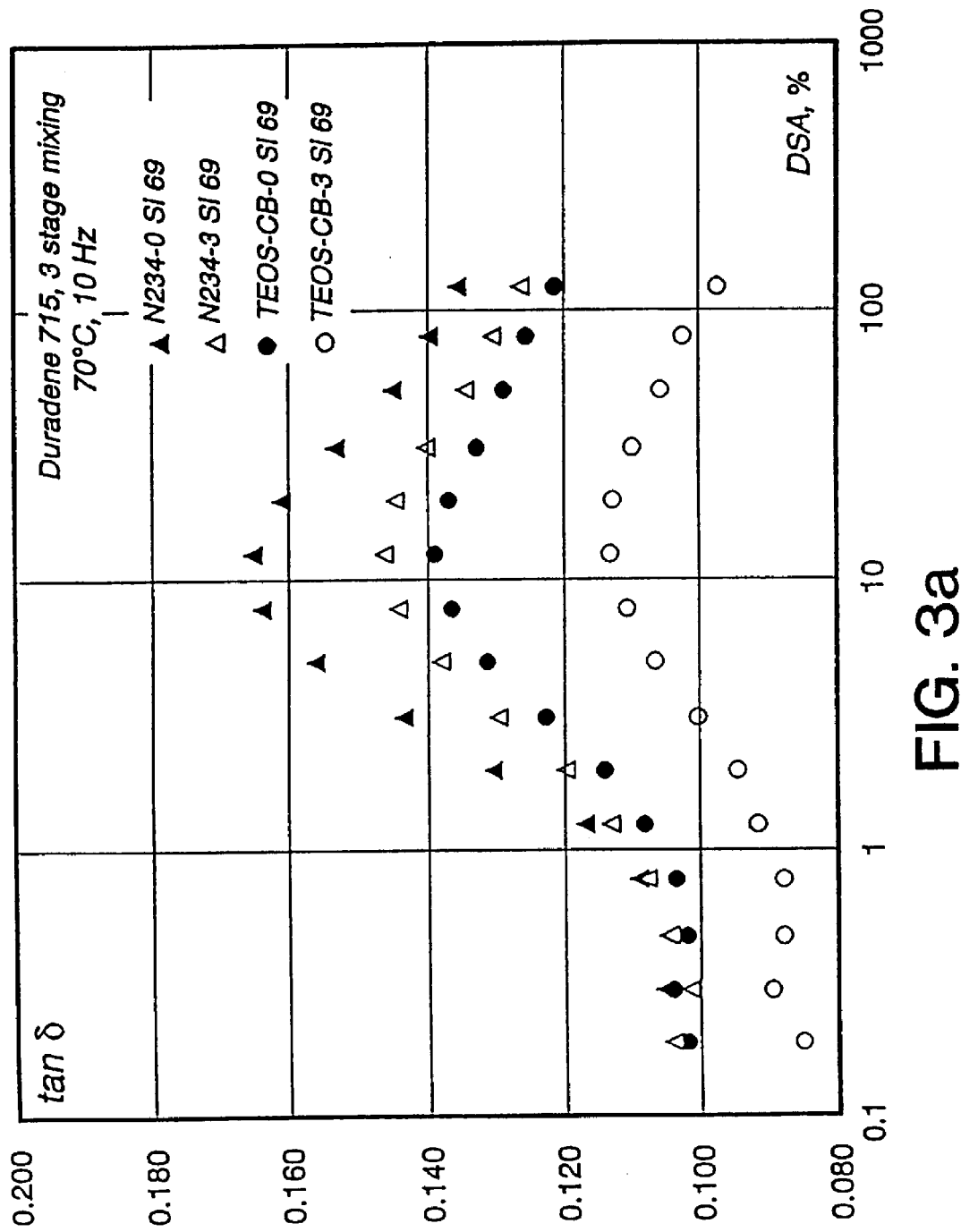
FIGS. 3a, 3b and 3c are graphs demonstrating hysterisis values measured at different temperatures and strains on elastomeric compositions of the present invention.
Figure 3B:
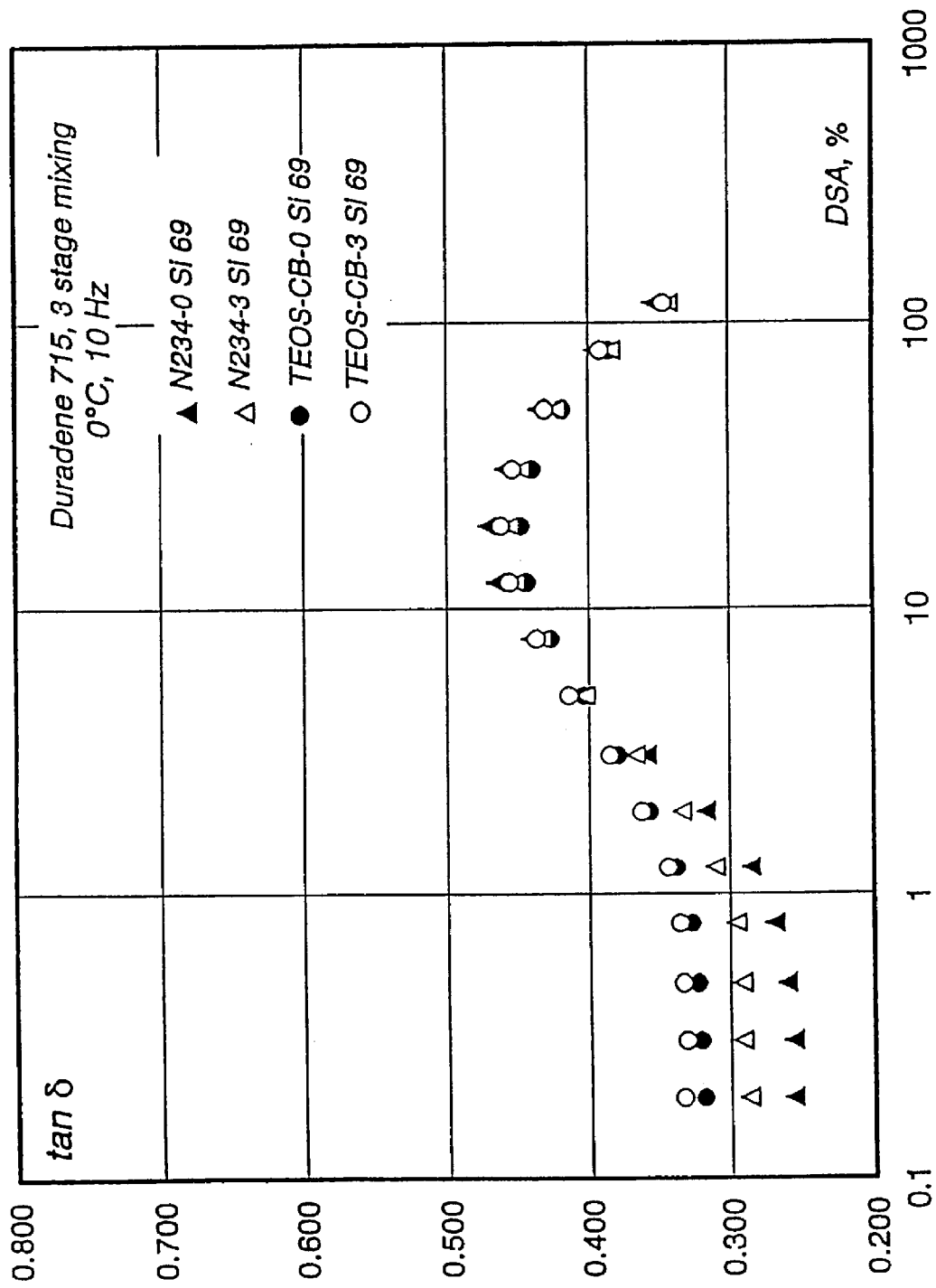
Figure 3C:
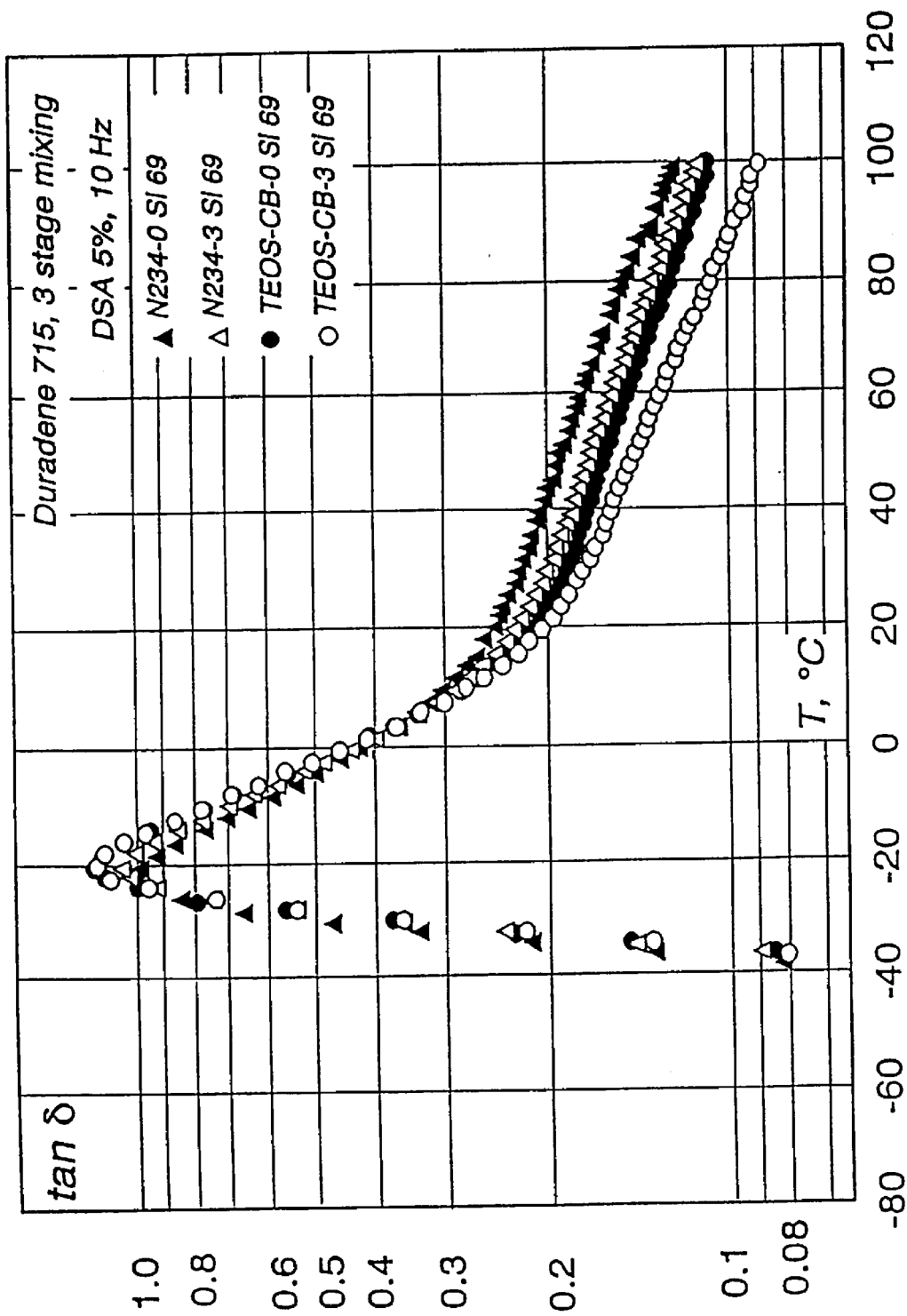
Figure 4A:
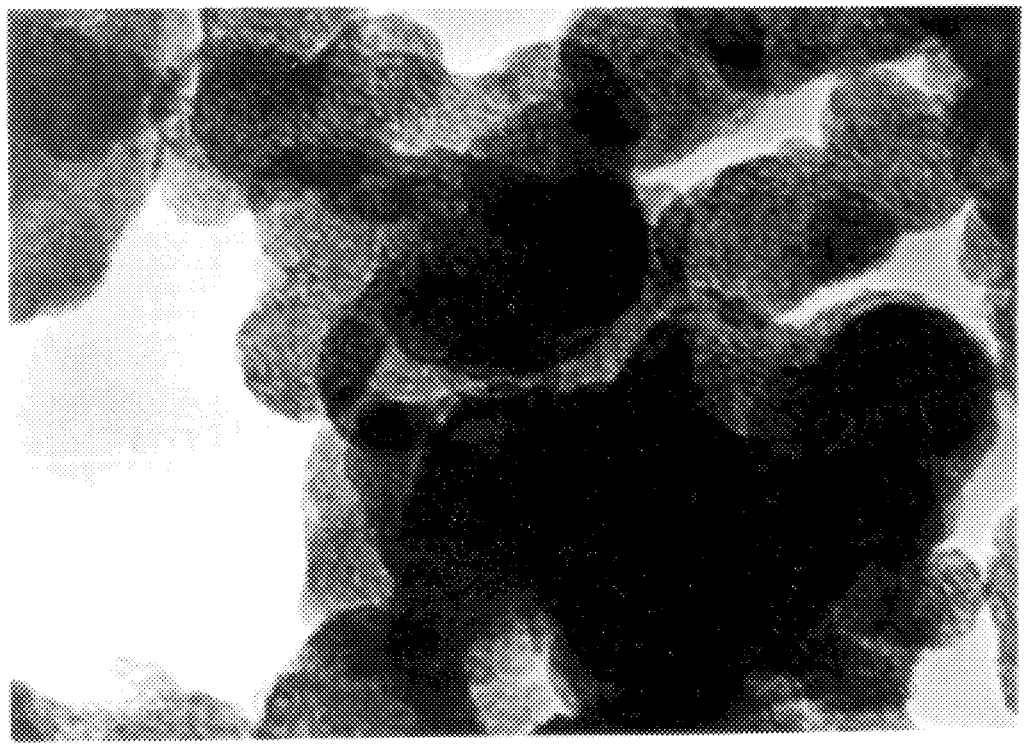
FIGS. 4a–4d are photomicrographs comparing carbon blacks useful in the present invention and prior art carbon blacks.
Figure 4B:
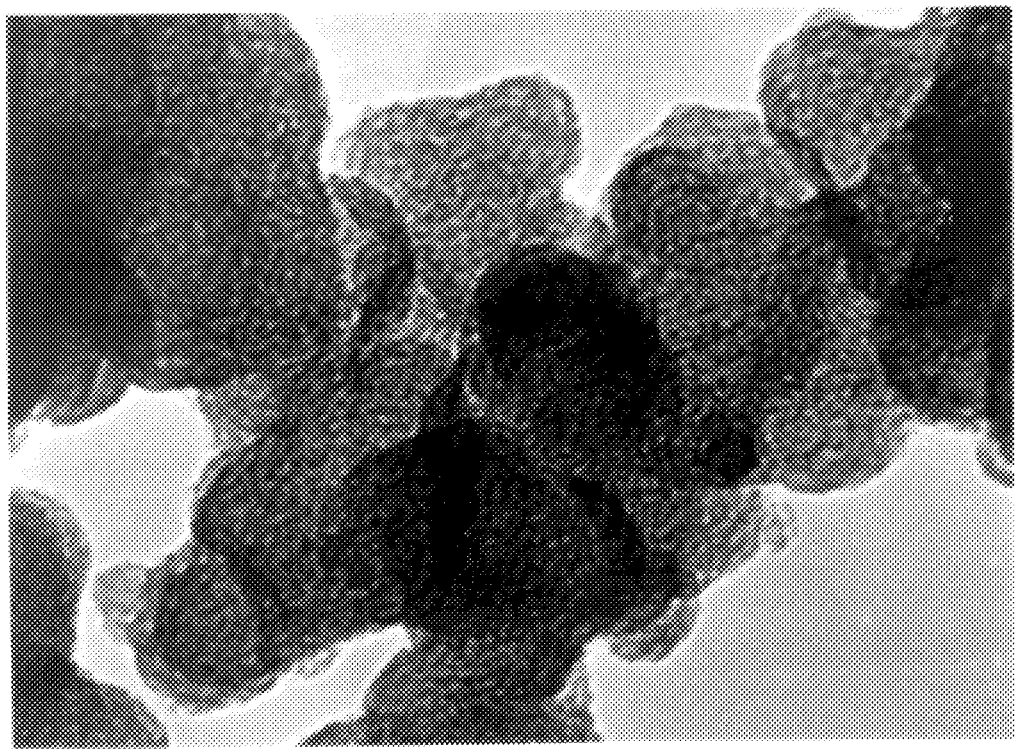
Figure 4C:
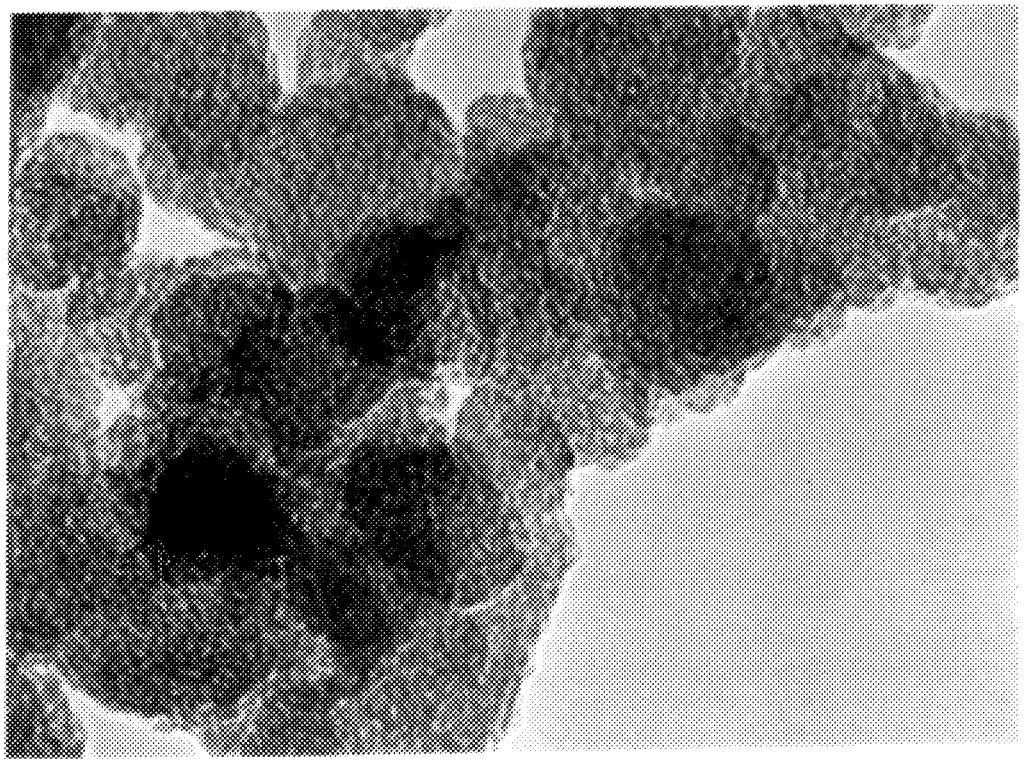
Figure 4D:
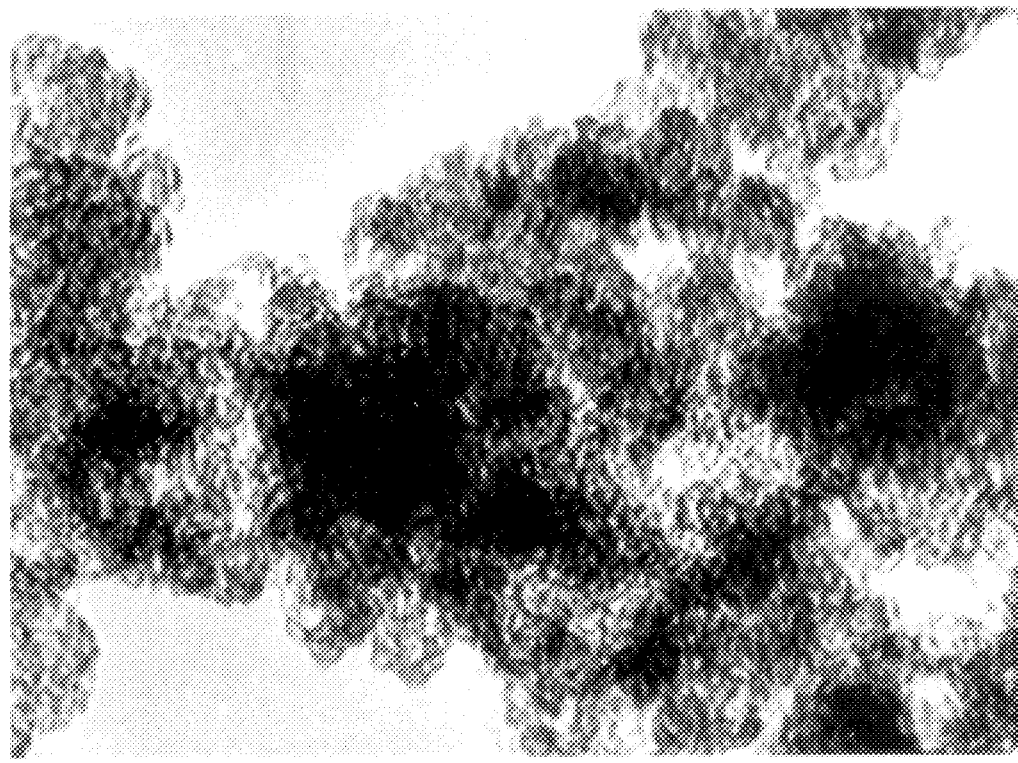

Abrasion resistance was determined using an abrader, which is based on a Lambourn-type machine as described in U.S. Pat. No. 4,995,197, hereby incorporated by reference. The tests were carried out at 14% slip. The percentage slip is determined based on the relative velocities of a sample wheel and a grindstone wheel. The abrasion resistance index is calculated from the mass loss of the elastomeric compound. Dynamic properties were determined using a Rheometrics Dynamic Spectrometer II (RDS II, Rheometrics, Inc., N.J.) with strain sweep. The measurements were made at 0° and 70° C. with strain sweeps over a range of double strain amplitude (DSA) from 0.2 to 120%. The maximum tan δ values on the strain sweep curves were taken for comparing the hysterisis among elastomeric compounds as can be seen in FIGS. 3a and 3b. Alternatively, hysterisis measurements were made by means of temperature sweeps at a DSA of 5% and a frequency of 10 Hz. The temperature range was from −60° C. to 100° C., as seen in FIG. 3c.

TABLE 6

Dynamic Hysterisis Data

| SSBR Composition[a] | Si-69 | tanδ at 0° C. | tanδ at 70° C. | abrasion at 14% slip |
|---|---|---|---|---|
| N234 | 0 | 0.400 | 0.189 | 100 |
| N234 | 3 | 0.429 | 0.170 | 103.5 |
| OMTS-CB | 0 | 0.391 | 0.175 | 84.4 |
| OMTS-CB | 3 | 0.435 | 0.152 | 110.5 |
| TEOS-CB | 0 | 0.400 | 0.167 | 78.1 |
| TEOS-CB | 3 | 0.433 | 0.142 | 97.2 |

[a]Duradene 715; two stage mixing.

As seen in Table 6 above, tan δ at 70° C. values were reduced by 7%, tan δ at 0° C. values reduced by 2.3% and the wear resistance was reduced by 15%, for the SSBR samples when OMTS-CB was substituted for N234. However, when the Si-69 coupling agent was incorporated into the composition, the wear resistance for the OMTS-CB sample improved to 110% of the value for N234. The tan δ at 70° C. values decreased by 19.6% compared to N234 without coupling agent and 10.5% compared to N234 with coupling agent. The tan δ at 0° C. values increased by 11% when the coupling agent was added to the OMTS-CB, compared to OMTS-CB without coupling agent. Similarly, for TEOS-CB, the tan δ at 70° C. value is reduced by 11.6%, the tan δ at 0° C. value is unchanged and the wear is reduced by 21.9%. When compounded with the coupling agent, the tan δ at 70° C. value is reduced by 24.9%, the tan δ at 0° C. value is increased by 8.3% and the wear decreased by only 2.8%.

It was determined that employing the treated carbon blacks and an elastomer in an elastomeric composition of the present invention generally resulted in poor abrasion resistance, compared to an elastomeric composition including the same elastomer and N234 carbon black. However, as seen in Table 6, when Si-69 coupling agent was incorporated into the composition, abrasion resistance returned to approximately the same values as obtained with untreated carbon black.

As used herein, "untreated carbon black" means a carbon black prepared by a process similar to that used to prepare the corresponding treated black, but without the volatizable silicon compound and by making suitable adjustments to the process conditions to achieve a carbon black with an external surface area approximately equal to that of the treated black.

Example 6A

The dynamic hysterisis and abrasion properties of a black made by following the procedure of Example 3A (and containing 1.91% Si) were measured as in Example 6. As seen in Table 6A below, tan δ at 70° C. values were reduced by 14%, tan δ at 0° C. values were reduced by 6% and the wear resistance was reduced by 22%, for the SSBR samples when TEOS-CB' was substituted for N234. However, when Si69 coupling agent was incorporated into the composition, the wear resistance for the TEOS-CB sample improved to 108% of the value for N234. The tan δ at 70° C. values decreased by 18% compared to N234 without coupling agent and 7% compared to N234 with coupling agent. The tan δ at 0° C. values decreased by only 1.5% when the coupling agent was added to TEOS-CB', compared to N234 with coupling agent.

TABLE 6A

Dynamic Hysterisis Data

| SSBR Composition[a] | Si 69 | tanδ @ 0° C. | tanδ @ 70° C. | Abrasion @14% Slip |
|---|---|---|---|---|
| N234 | 0 | 0.428 | 0.184 | 100 |
| N234 | 4 | 0.394 | 0.162 | 94 |
| TEOS-CB' | 0 | 0.402 | 0.158 | 78 |
| TEOS-CB' | 4 | 0.388 | 0.151 | 108 |

[a]Cariflex S-1215; two stage mixing

Example 7

Improvement in Hysterisis by Three Stage Compounding

The beneficial properties obtained using the treated carbon blacks with the elastomeric compounds of the present invention may be further enhanced by using an additional mixing stage during the compounding process. The procedure for two stage mixing used in the previous compounding examples, is described above in Example 4.

For three stage mixing, the stage 1 mixer was set at 80° C. and 60 rpm. After conditioning to 100° C. by heating the chamber with a dummy mixture, the elastomer was introduced to the mixer at 100° C. and masticated for one minute. The carbon black was added to the elastomer and mixing continued for an additional three minutes. In some cases, a coupling agent was also added with the carbon black, at a rate of 3 to 4 parts per hundred of elastomer. The stage 1 masterbatch was then dumped and passed through an open mill three times and stored at room temperature for 2 hours. The second stage chamber temperature was also set at 80° C. and 60 rpm. After conditioning to 100° C., the masterbatch was introduced to the mixer, masticated for one minute, and the antioxidant was then added. At four minutes or when a temperature of 160° C. is reached, the stage 2 masterbatch was dumped and passed through the open mill 3 times and stored at room temperature for 2 hours. The third stage chamber temperature was set at 80° C. and 35 rpm. The masterbatch from stage 2 was then added to the mixer and masticated for 1 minute. The curing package was then added and the stage 3 material was dumped at 2 minutes and passed through an open mill 3 times.

Table 7 below compares hysterisis and abrasion characteristics for elastomers compounded with TEOS-CB using two and three stage mixing. As can be seen from the Table, three stage mixing results in higher tan δ at 0° C. and lower tan δ at 70° C.

TABLE 7

Dynamic Hysterisis Data—2 Stage v. 3 Stage Mixing

| Carbon Black | Si-69 | tanδ at 0° C. | tanδ at 70° C. | abrasion at 14% slip |
|---|---|---|---|---|
| Duradene 715 Two Stage Mixing | | | | |
| N234 | 0 | 0.458 | 0.189 | 100 |
| N234 | 3 | 0.439 | 0.170 | 103.5 |
| TEOS-CB | 0 | 0.434 | 0.150 | 78.1 |
| TEOS-CB | 3 | 0.436 | 0.131 | 97.2 |
| Duradene 715 Three Stage Mixing | | | | |
| N234 | 0 | 0.471 | 0.165 | 100 |
| N234 | 3 | 0.456 | 0.146 | 98.4 |
| TEOS-CB | 0 | 0.446 | 0.139 | 57.6 |
| TEOS-CB | 3 | 0.461 | 0.113 | 101.8 |

Example 8

Oxidized Carbon Black

In another aspect of the present invention, it was determined by the present inventors that oxidation of the silicon-treated carbon black can lead to elastomeric compositions with enhanced hysterisis. For a black made using the conditions of Table 1, but with OMTS as the volatilizable silicon-containing compound, and 2.74% silicon in the final black, the improvement obtained with oxidation is illustrated in the following Table. The hysterisis performance with the oxidized black is further enhanced by incorporating a coupling agent into the elastomeric compound.

The oxidized carbon black was prepared by treating the black with nitric acid. A small stainless steel drum was loaded with carbon black and rotated. During rotation a 65% nitric acid solution is sprayed onto the carbon black, until 15 parts per hundred carbon black had been added. After a soak period of 5 minutes, the drum was heated to about 80° C. to initiate the oxidation reaction. During the oxidation reaction, the temperature increased to about 100°–120° C. This temperature was held until the reaction was completed. The treated black was then heated to 200° C. to remove residual acid. The treated black was then dried overnight at 115° C. in a vacuum oven. Table 8 below compares hysterisis characteristics for elastomers compounded with OMTS-CB and oxidized OMTS-CB, with and without a coupling agent.

TABLE 8

Dynamic Hysterisis Data—oxidized, treated carbon black

| Carbon Black Duradene 715—2 stage | Si-69 | tanδ at 0° C. | tanδ at 70° C. |
|---|---|---|---|
| N234 | 0 | 0.513 | 0.186 |
| N234 | 3 | 0.463 | 0.176 |
| OMTS-CB | 0 | 0.501 | 0.166 |
| OMTS-CB | 3 | 0.467 | 0.135 |
| oxidized OMTS-CB | 0 | 0.487 | 0.154 |
| oxidized OMTS-CB | 3 | 0.467 | 0.133 |

Example 9

Hysterisis and Abrasion Resistance for a Variety of Elastomers

Hysterisis and abrasion resistance was compared for elastomeric compounds prepared with treated carbon blacks compounded with different elastomers, compounded with and without a coupling agent. Conventional carbon black was used as a control. The results are set forth in the Table 9 below.

These data show hysterisis improvement for all five elastomer systems tested. For example, the tan δ at 70° C. is reduced by between 10.5 and 38.3% without a coupling agent, and by between 11.7 and 28.2% with a coupling agent, compared to the corresponding control.

It can also be seen that in all cases abrasion resistance for the treated carbon black compound compared to the untreated control decreases when no coupling agent is used. Abrasion resistance is substantially improved when the coupling agent is used. It can also be seen that the hysterisis balance is improved with treated carbon black (with or without coupling agent), compared to control carbon black.

TABLE 9

Hysterisis and Abrasion Resistance—3 Stage Mixing

| Carbon Black | Si-69 | tanδ at 0° C. | tanδ at 70° C. | wear at 14% slip |
|---|---|---|---|---|
| Solution SBR 116/N5 114—80/20 blend | | | | |
| N234 | 0 | 0.689 | 0.151 | 100.0 |
| N234 | 3 | 0.750 | 0.131 | 123.1 |
| TEOS-CB | 0 | 0.721 | 0.115 | 86.3 |
| TEOS-CB | 3 | 0.751 | 0.094 | 115.4 |
| Solution SBR SL 574 | | | | |
| N234 | 0 | 0.286 | 0.118 | 100.0 |
| N234 | 3 | 0.260 | 0.168 | 96.4 |
| TEOS-CB | 0 | 0.246 | 0.101 | 58.0 |
| TEOS-CB | 3 | 0.258 | 0.093 | 86.8 |
| Solution SBR PAT589 | | | | |
| N234 | 0 | 0.676 | 0.190 | 100.0 |
| N234 | 3 | 0.686 | 0.182 | 99.1 |
| TEOS-CB | 0 | 0.698 | 0.170 | 82.4 |
| TEOS-CB | 3 | 0.726 | 0.150 | 134.2 |
| Emulsion SBR 1500 | | | | |
| N234 | 0 | 0.299 | 0.176 | 100.0 |
| N234 | 3 | 0.285 | 0.137 | 87.9 |
| TEOS-CB | 0 | 0.280 | 0.156 | 60.1 |
| TEOS-CB | 3 | 0.270 | 0.121 | 88.1 |
| Natural Rubber SMR 5 | | | | |
| N234 | 0 | 0.253 | 0.128 | 100.0 |
| N234 | 3 | 0.202 | 0.088 | 85.8 |
| TEOS-CB | 0 | 0.190 | 0.079 | 60.9 |
| TEOS-CB | 3 | 0.173 | 0.069 | 88.6 |

All patents, patent applications, test methods, and publications mentioned herein are incorporated by reference.

Many variations of the present invention will suggest themselves to those skilled in the art in light of the above detailed disclosure. For example, the compositions of the present invention may include other reinforcing agents, other fillers, oil extenders, antidegradants, and the like. All such modifications are within the full intended scope of the claims.

What is claimed is:

1. An elastomeric compound comprising a) an elastomer and b) an aggregate comprising a carbon Phase and a silicon-containing species phase, wherein said aggregate imparts to the elastomer poorer abrasion resistance, comparable or higher loss tangent at low temperature and a lower loss tangent at high temperature, compared to carbon black.

2. The elastomeric compound of claim 1, wherein said silicon-containing species phase exists as regions primarily at the surface of the aggregate.

3. The elastomeric compound of claim 1, wherein said silicon-containing species phase exists as regions distributed throughout the aggregate.

4. The elastomeric compound of claim 1, wherein said aggregate is oxidized.

5. The elastomeric compound of claim 1, wherein said elastomer is selected from the group consisting of solution SBR, natural rubber, functional solution SBR, emulsion SBR, polybutadiene, polyisoprene, and blends of any of the foregoing.

6. The elastomeric compound of claim 1, wherein said silicon-containing species phase comprises between about 0.1% and about 25% silicon, by weight of the aggregate.

7. The elastomeric compound of claim 6, wherein said silicon-containing species phase comprises between about 0.5% and about 10% silicon, by weight of the aggregate.

8. The elastomeric compound of claim 7, wherein said silicon-containing species phase comprises between about 2% and about 6% silicon, by weight of the aggregate.

9. A method for improving the hysterisis of an elastomeric compound comprising compounding an elastomer with an aggregate comprising a carbon Phase and a silicon-containing species phase, wherein said aggregate imparts to the elastomer poorer abrasion resistance, comparable or higher loss tangent at low temperature and a lower loss tangent at high temperature, compared to carbon black.

10. The method of claim 9, wherein said silicon-containing species phase exists as regions primarily at the surface of the aggregate.

11. The method of claim 9, wherein said silicon-containing species phase exists as regions distributed throughout the aggregate.

12. The method of claim 9, wherein said aggregate is oxidized.

13. The method of claim 9, wherein said elastomer is selected from the group consisting of solution SBR, natural rubber, functional solution SBR, emulsion SBR, polybutadiene, polyisoprene, and blends of any of the foregoing.

14. The method of claim 9, wherein said silicon-containing species phase comprises between about 0.1% and about 20% silicon, by weight of the aggregate.

15. The method of claim 14, wherein said silicon-containing species phase comprises between about 0.5% and about 10% silicon, by weight of the aggregate.

16. The method of claim 15, wherein said silicon-containing species phase comprises between about 2% and about 6% silicon, by weight of the aggregate.

17. The elastomeric compound of claim 1, wherein said aggregate has a greater nitrogen surface area after extraction with hydrofluoric acid compared to said aggregate prior to said extraction.

18. The elastomeric compound of claim 17, wherein said aggregate has a nitrogen surface area that is at least 4 $m^2/g$ more than said aggregate prior to said extraction.

19. The elastomeric compound of claim 1, wherein said aggregate comprises at least one primary particle, wherein said primary particle comprises a carbon phase and a silicon-containing phase species.

* * * * *